(12) United States Patent
Ginsburg et al.

(10) Patent No.: US 8,725,088 B2
(45) Date of Patent: May 13, 2014

(54) ANTENNA SOLUTION FOR NEAR-FIELD AND FAR-FIELD COMMUNICATION IN WIRELESS DEVICES

(75) Inventors: Brian Paul Ginsburg, Allen, TX (US);
Gangadhar Burra, Plano, TX (US);
Assaf Sella, Plano, TX (US);
Subhashish Mukherjee, Bangalore (IN); Gireesh Rajendran, Trivandrum (IN); Yogesh Darwhekar, Bangalore (IN); Apu Sivadas, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 301 days.

(21) Appl. No.: 12/753,966

(22) Filed: Apr. 5, 2010

(65) Prior Publication Data

US 2011/0243120 A1    Oct. 6, 2011

(51) Int. Cl.
*H04B 1/44* (2006.01)

(52) U.S. Cl.
USPC .................................. 455/83; 455/78; 455/82

(58) Field of Classification Search
USPC ............ 455/19, 41.1, 41.2, 78, 82, 83, 435.2, 455/553.1
See application file for complete search history.

(56) References Cited

U.S. PATENT DOCUMENTS 7,373,172 B2 * 5/2008 Godfrey ..................... 455/552.1
8,369,889 B2 * 2/2013 Rofougaran et al. ...... 455/552.1

* cited by examiner

*Primary Examiner* — Tuan H Nguyen
(74) *Attorney, Agent, or Firm* — Ronald O. Neerings; Wade James Brady; Frederick J. Telecky, Jr.

(57) ABSTRACT

A single-antenna solution is provided for near-field and far-field communication in wireless devices. In an embodiment, a first transceiver block generates a first transmit signal to be transmitted using radiative techniques. A second transceiver block generates a second transmit signal to be transmitted using inductive coupling. The first and second transceiver blocks are coupled to a same antenna for transmitting the first transmit signal using radiative coupling, and the second transmit signal using inductive coupling. The first transceiver block and the second transceiver block operate according to time division multiplexing, and in an embodiment corresponding to an FM transceiver and an NFC transceiver.

14 Claims, 3 Drawing Sheets

ANTENNA SOLUTION FOR NEAR-FIELD AND FAR-FIELD COMMUNICATION IN WIRELESS DEVICES

BACKGROUND

1. Technical Field

Embodiments of the present disclosure relate generally to antennas, and more specifically to antenna solution for near and far-field communication in wireless devices.

2. Related Art

A wireless device receives and transmits signals wirelessly (on a wireless medium), and may contain corresponding receive and transmit circuits. Some examples of wireless devices are mobile phones, personal digital assistants (PDA), etc.

Wireless devices may communicate using near-field communication (NFC) techniques and/or far-field communication techniques. NFC, generally, refers to short range (of the order of a few centimeters) wireless communication technology that enables exchange of data between two or more wireless devices, generally by inductive coupling. Inductive coupling refers to the generation of voltage/current in one coil due to (and proportional to) a change in voltage/current (and hence the corresponding magnetic field) in another coil, the two coils being termed as being "inductively coupled" to each other (and which may thus be viewed as 'antennas'). Currently, NFC communication is standardized and designed to operate within the globally available and unlicensed radio frequency ISM band of 13.56 MHz.

Far-field communication, generally, refers to long-range wireless communication between two or more wireless devices, typically using radiative techniques. Radiative (transmission and/or reception) techniques generally rely on electromagnetic radiation for wireless energy transfer, and typically use one or more radiating element(s) (termed antennas) for transmitting and receiving wireless signals. Frequency modulation (FM) and amplitude modulation (AM) are examples of far-field communication.

Several embodiments described below are directed to an antenna solution for near and far-field communication in wireless devices.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A first transceiver block generates a first transmit signal to be transmitted using radiative techniques. A second transceiver block generates a second transmit signal to be transmitted using inductive coupling. The first and second transceiver blocks are coupled to a same antenna for transmitting the first transmit signal using radiative coupling, and the second transmit signal using inductive coupling.

Several aspects are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

The drawing in which an element first appears is indicated by the leftmost digit(s) in the corresponding reference number.

DETAILED DESCRIPTION

Various embodiments are described below with several examples for illustration.

1. Example Device

Figure 1:
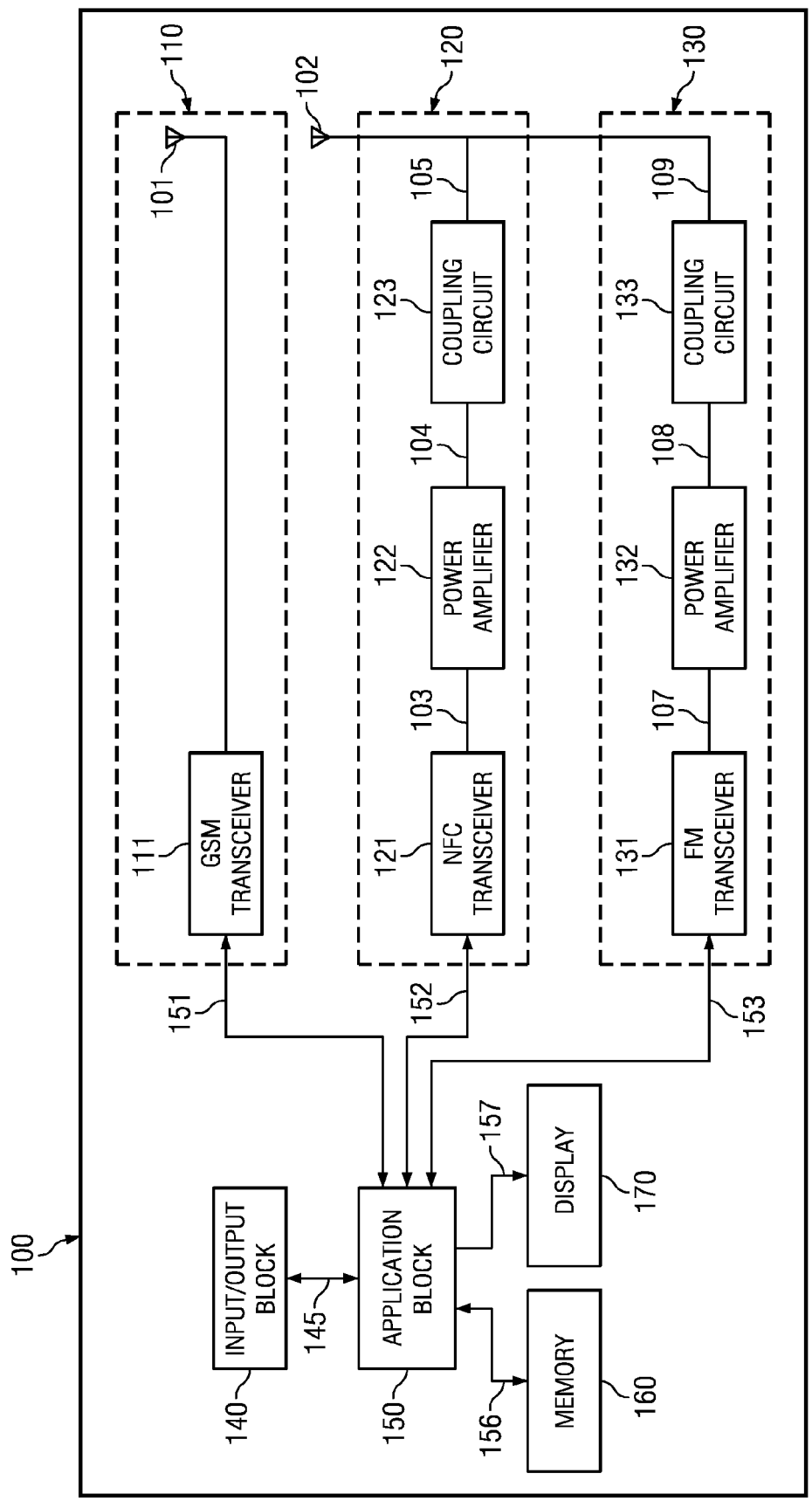
FIG. 1 is a block diagram of an example environment in which several embodiments can be implemented.

FIG. 1 is a block diagram of an example device in which several embodiments may be implemented. The block diagram shows mobile phone 100, which is in turn shown containing a Global System for Mobile Communication (GSM) block 110, a Near-field Communication (NFC) block 120, a Frequency Modulation (FM) block 130, application block 150, display 170, input/output (I/O) block 140, and memory 160. The components/blocks of mobile phone 100 in FIG. 1 are shown merely by way of illustration. However, mobile phone 100 may contain more or fewer components/blocks. Further, although described as using GSM technology, mobile phone 100 may instead be implemented using other technologies such as CDMA (Code Division Multiple Access) also.

GSM block 110 is shown containing GSM transceiver 111 and antenna 101, and operates to provide wireless telephone operations in a known way. GSM transceiver 111 may contain receiver and transmitter sections internally (not shown) to perform the corresponding receive and transmit operations.

NFC block 120 is shown containing NFC transceiver 121, power amplifier 122 and coupling circuit 123, and uses inductive coupling for wireless communication. FM block 130 is shown containing FM transceiver 131, power amplifier 132, and coupling circuit 133, and uses radiative techniques for wireless communication.

Antenna 102 is used by both NFC block 120 and FM block 130 for transmission (as well as reception) of the corresponding signal types, and is therefore referred to as a single antenna. The single antenna is characterized in that the same physical structure would be used as point or region of contact in the wireless medium to receive/transmit signal. NFC block 120 and FM block 130 operate in a time division multiplexed manner in using such single antenna.

NFC block 120 may operate consistent with specifications described in Near-field Communication Interface and Protocol-1 (NFCIP-1) and Near-field Communication Interface and Protocol-2 (NFCIP-2) and standardized in ECMA-340, ISO/IEC 18092, ETSI TS 102 190, ISO 21481, ECMA 352, ETSI TS 102 312, etc.

NFC transceiver 121 may contain a NFC transmission section and a NFC receive section, each containing corresponding baseband processing blocks, up-converter and down converter blocks, filters, etc., with the implementation of the respective blocks being consistent with one or more of the standards noted above. NFC transceiver 121 generates NFC signals consistent with the relevant standard(s) (for example, modulation used may be amplitude shift keying), and provides the signals (at a final (up-converted) frequency) to power amplifier 122 via path 103. Power amplifier 122 provides power amplification to the received NFC signals, which are then provided to coupling circuit 123 via path 104, and thence to antenna 102 (via path 105), which 'transmits' the NFC signals by inductive coupling. NFC transceiver 121 may also receive NFC signals by inductive coupling via antenna 102 and corresponding processing blocks (containing filters, down-conversion blocks, etc.), which are not shown in FIG. 1.

Coupling circuit 123 operates to provide impedance matching between the output of power amplifier 122 and antenna 102. In particular, coupling circuit 123 is designed to isolate the signal provided on path 109 (output of FM block 130, described below) from the components in the output stage of power amplifier 122 and from the components in portions of coupling circuit 123 itself, thereby facilitating connection of both NFC block 120 and FM block 130 to the same antenna 102. Although not shown in FIG. 1, NFC block 120 may also contain corresponding components/blocks for processing of NFC signals that may be received (from other transmitting NFC devices) by antenna 102.

FM block 130 may contain an FM transmission section and an FM reception section, each containing corresponding baseband processing blocks, up-converter and down converter blocks, filters, etc. FM transceiver 131 generates FM signals according to corresponding FM specification(s), and provides the FM signals (at radio frequency (RF)) to power amplifier 132 via path 107. The FM signals provided to power amplifier 122 may use the RF band 88 MHz to 108 MHz, as specified by the FM standard. Power amplifier 132 provides power amplification to the received FM signals, which are then provided to coupling circuit 133 via path 108, and thence to antenna 102 (via path 109), which transmits the FM signals by radiation. FM transceiver 131 may also receive FM signals by radiation via antenna 102 and corresponding processing blocks (containing filters, down-conversion blocks, etc.), not shown in FIG. 1.

Coupling circuit 133 is designed to isolate the signal provided on path 105 (output of NFC block 120) from the output section of power amplifier 132, and from portions of coupling circuit 133 itself, thereby also facilitating, in combination with coupling circuit 123, connection of both NFC block 120 and FM block 130 to the same antenna 102. In addition, coupling circuit 133 may be designed to provide impedance matching between the output of power amplifier 132 and antenna 102. Although not shown in FIG. 1, FM block 130 may also contain corresponding components/blocks for processing of FM signals that may be received (from other transmitting FM devices) by antenna 102.

Respective transceivers of blocks 110, 120, 130 may be implemented, on a same integrated circuit (IC), on different ICs, or using discrete components. Coupling circuits 123 and 133 may be implemented using discrete components, or within an IC.

Application block 150 may contain corresponding hardware circuitry (e.g., one or more processors), and operates to provide various user applications provided by mobile phone 100. The user applications may include voice call operations, data transfers, etc. Application block 150 may operate in conjunction with blocks 110, 120, and 130 to provide such features, and communicates with the respective blocks 110, 120, and 130 via paths 151, 152 and 153 respectively.

Display 170 displays images in response to the corresponding display signals received from application block 150 on path 157. The images may be generated by a camera provided in mobile phone 100, but not shown in FIG. 1. Display 170 may contain memory (frame buffer) internally for temporary storage of pixel values for image refresh purposes, and may be implemented, for example, as a liquid crystal display screen with associated control circuits. I/O block 140 provides a user with the facility to provide inputs via path 145, for example, to dial numbers. In addition I/O block 140 may provide on path 145 outputs that may be received via application block 150.

Memory 160 stores program (instructions) and/or data (provided via path 156) used by application block 150, and may be implemented as RAM, ROM, flash memory, etc, and thus contains volatile as well as non-volatile storage elements. The description is continued with illustrations of circuits 123 and 133 and antenna 102, and the manner in which sharing of antenna 102 by blocks 120 and 130 is enabled.

2. Shared Antenna with Multiple Taps

Figure 2:
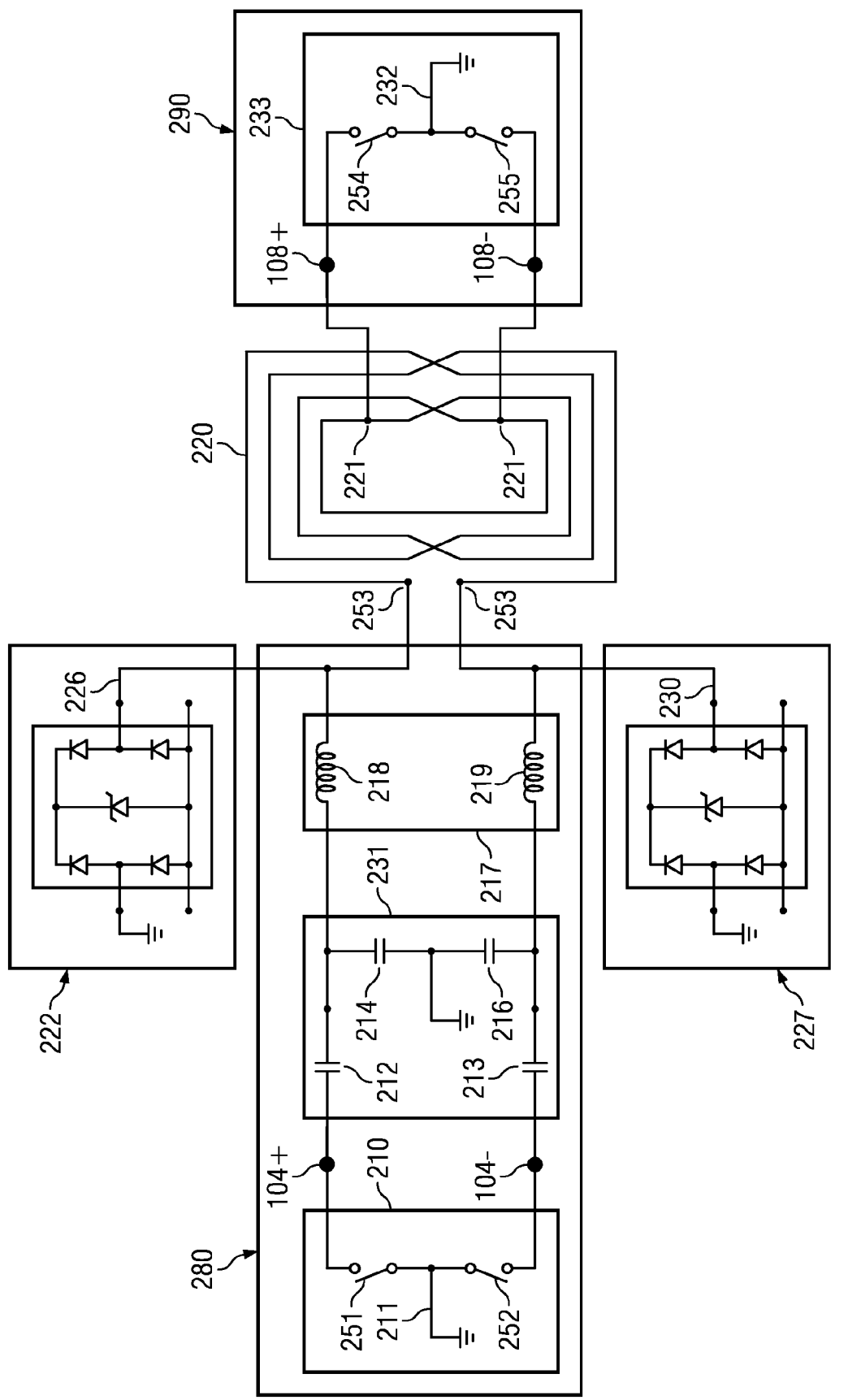
FIG. 2 illustrates an embodiment in which a same antenna is used both for near and far-field communication in a wireless device.

FIG. 2 is a diagram illustrating a scheme that enables the use of a single antenna both for near-field as well as for far-field communication, in an embodiment. In the embodiment illustrated in FIG. 2, it is assumed that the single (shared) antenna is used for transmission and/or reception of both FM and NFC signals. However, in other embodiments, the specific nature of the far-field communication device/technique and near-field communication device/technique may be different, with corresponding modifications in the implementation of coupling circuits 123 and 133. Further, it is assumed that FM and NFC signals are transmitted (and received) in a time division multiplexed (TDM) manner. Signal paths in FIG. 2 are assumed to be differential. However, the techniques described below can be applied, with corresponding modifications, to circuits that are designed to have single-ended signal paths as well.

FIG. 2 is shown containing coupling circuits 280 and 290, antenna 220 and electrostatic discharge (ESD) protection circuits 222 and 227. Coupling circuits 280 and 290, and antenna 220 correspond respectively to coupling circuits 123 and 133, and antenna 102 of FIG. 1. Paths 104 and 108 of FIG. 1 correspond respectively to differential paths/terminals 104+/104− and 108+/108− of FIG. 2. In the interest of clarity, the remaining components/blocks of mobile phone 100 of FIG. 1 are not shown in FIG. 2.

In FIG. 2, NFC signals in differential form output by power amplifier 122 (of FIG. 1) are assumed to be provided across terminals 104+ and 104−, while FM signals in differential form output by power amplifier 132 (of FIG. 1) are assumed provided across terminals 108+ and 108−. NFC signals across terminals 104+ and 104− propagate via matching block 231 and isolating block 217 to antenna port 253. FM signals across terminals 108+ and 108− are provided directly to antenna port 221.

Coupling circuit 280 is shown containing switch block 210, impedance matching network 231, and isolating block 217. Switch block 210 is shown containing switches 251 and 252, the junction of the switches being connected to ground (constant reference potential) via path 211. When NFC signals are being transmitted, matching network 231 (shown containing capacitors 212, 213, 214 and 216) ensures impedance matching between the output impedance of power amplifier 122 (of FIG. 1) which provides NFC signals in differential form across terminals 104+ and 104− (FIG. 2) and the input impedance of antenna 220. to maximize the current through the antenna windings. One of the terminals of each of capacitors 214 and 216 is connected to ground. It is noted that capacitors 214 and 216 may represent parasitic capacitances due to devices connected to these terminals or components specifically implemented for matching.

Isolating block 217 is shown containing inductors 218 and 219, each connected to the respective terminals of port 253 of antenna 220. Inductance values of inductors 218 and 219 are selected to provide zero (or very low) impedance to NFC signals propagating from the output of power amplifier 122 (FIG. 1) to antenna 220, while providing infinite (or very high) impedance to FM signals propagating from the output of power amplifier 132 (FIG. 1) to antenna 220.

Coupling circuit 290 is shown containing switch block 233. Switch block 233 is shown containing switches 254 and 255, the junction of the switches being connected to ground via path 232. ESD (electro-static discharge) protection circuits 222 and 227 are shown containing four diodes and a Zener diode each, and respectively connected (via paths path 226 and 230) to the corresponding terminals of port 253 of antenna 220. Protection circuits 222 and 227 provide discharge paths to ground for static charges that may be generated on antenna 220 due, for example, to accidental contact/brushing of (portions) of antenna 220 with static-charge-generating surfaces. Switches 251, 252 254 and 255 may be implemented, for example using CMOS transistors, and their opening and closing may be achieved by corresponding control signals (not shown) that may be generated, for example, by application block 150 (or any of blocks 120 or 130) in a known way. Although not shown in FIG. 2, a second pair of ESD protection circuits (similar to protection circuits 222 and 227 may be provided electrically connected to terminals/paths 108+ and 108−. Antenna 220 is designed as a multi-tap antenna (implemented for example, as a planar spiral inductor), and may have multiple turns/loops. The inductance value presented to NFC signals (i.e., looking-in at port 253) is designed to have a value to enable efficient inductive coupling of the NFC signals (with the coil of another NFC device). The tapping at port 221 is designed to provide an inductance value (looking-in at port 221) suitable for efficient radiation of FM signals. In an embodiment, the inductance presented by antenna 220 at port 253 is four times the inductance offered across terminals 108+ and 108− (i.e. at port 221). Switches 254 and 255 of coupling block 290 are closed when NFC signals are to be transmitted (FM transmission is disabled when NFC signals are being transmitted) isolating FM transceiver 131 (FIG. 1) from NFC signals. Switches 251 and 252 are closed when FM signals are being transmitted (NFC transmission being disabled when FM signals are being transmitted), and the shunt combination of capacitors 212 and 214 is designed to be tuned out by inductor 218 (shunt combination of capacitors 216 and 213 being tuned out by inductor 219) at FM frequencies. Such operation isolates FM signals from being affected by impedance loading due to components in the NFC signal path (e.g., components in power amplifier 122). The lower inductance across terminals 108+ and 108− acts as a matching network that tunes the network seen by terminals 108+ and 108− to FM transmit or receive frequency. As a result the radiated or received power at terminals (108+/108−) at FM frequency is improved. On the other hand, the higher inductance presented at port 253 results in antenna 220 being tuned for a lower frequency like those of NFC signals (13.56 MHz) during transmission of NFC signals, and is thus optimum for the short range NFC communication. In general, the inductances presented at ports 221 and 253 are designed to enable resonance at NFC and FM operating frequencies respectively.

In operation, during transmit intervals of FM block 130 (a duration of time in which FM signals are transmitted), switches 254 and 255 of switch block 233 are open, and switches 251 and 252 of switch block 210 are closed, resulting in isolation of FM signals from being affected by impedance loading due to components in the NFC signal path, and FM transmission occurs unaffected. The operation of the circuit of FIG. 2 is similar to that described above during time intervals in which FM block 130 operates in receive mode (and receives an FM signal via antenna 220), and the description is not repeated here.

During transmit intervals of NFC block 120 (a duration of time in which NFC signals are transmitted), switches 251 and 252 of switch block 210 are open, switches 254 and 255 of switch block 233 are closed. Impedance of inductors 218 and 219 at NFC signal frequencies being low, and the higher inductance presented at port 253 being optimum for NFC communication, transmission of NFC signals occurs unaffected. The operation of the circuit of FIG. 2 is similar to that described above during time intervals in which NFC transceiver 120 is in receive mode (and receives an NFC signal via antenna 220), and the operation is not repeated here.

The technique of FIG. 2 requires antenna 220 to be implemented with multiple taps (ports 253 and 221 in FIG. 2). When both NFC transceiver 120 and FM transceiver 130 are integrated into the same integrated circuit (IC/SoC), multiple sets of traces may have to be provided on a printed circuit board (PCB), one to NFC output signal path and FM output signal path to respective antenna ports 253 and 221. Further two pairs of ESD protection circuits may needed to be provided for the approach of FIG. 2. The drawbacks noted above are overcome in another embodiment, described next.

3. Shared Antenna with Single Tap

Figure 3:
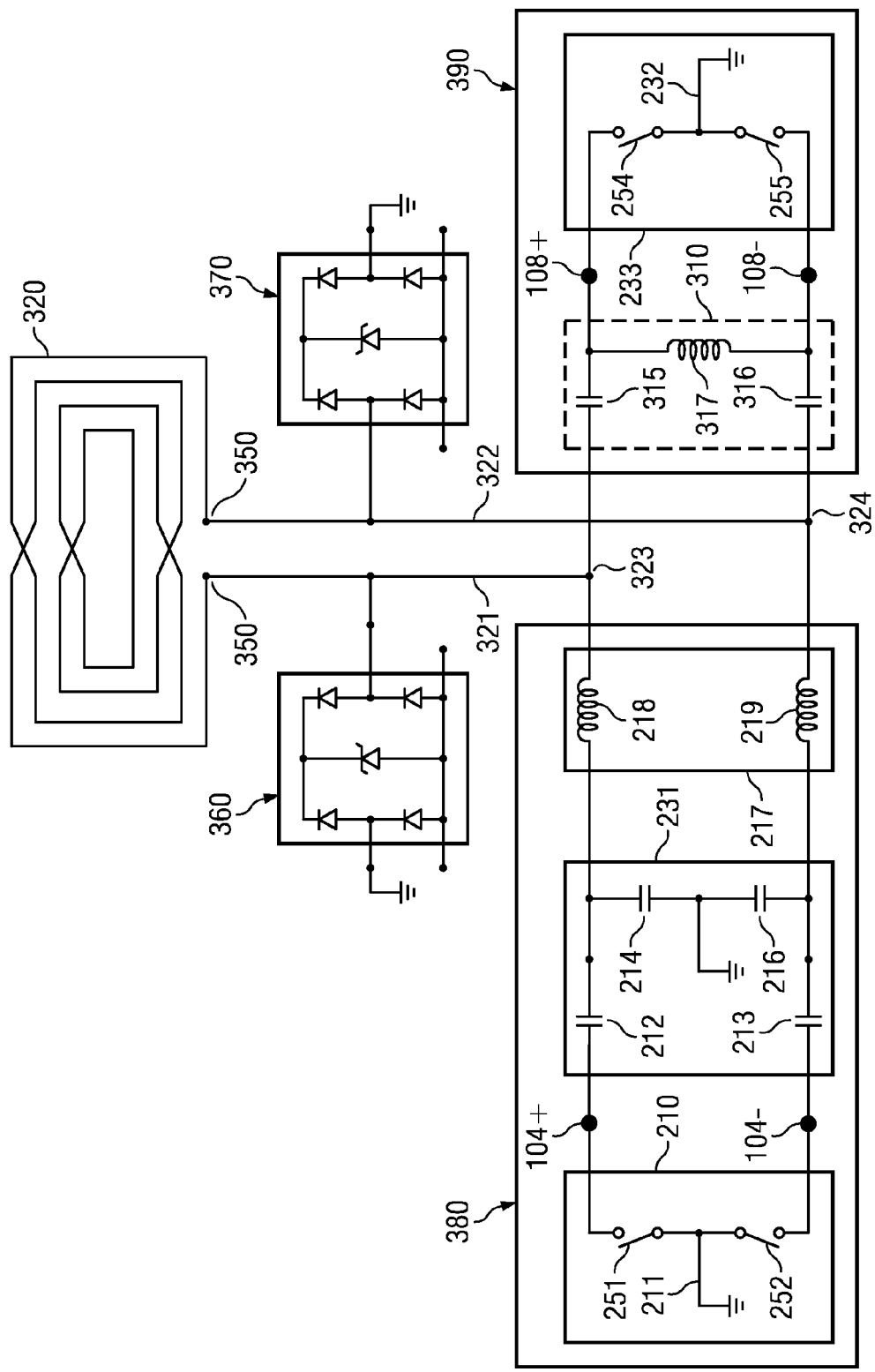
FIG. 3 illustrates another embodiment in which a same antenna is used both for near and far-field communication in a wireless device.

FIG. 3 is a diagram illustrating a scheme that enables the use of a single antenna with a single tap for near-field as well as for far-field communication, in an alternative embodiment. FIG. 3 is shown containing coupling circuits 380 and 390, antenna 320 and electrostatic discharge (ESD) protection circuits 360 and 370. Coupling circuits 380 and 390, and antenna 320 correspond respectively to coupling circuits 123 and 133, and antenna 102 of FIG. 1. Paths 104 and 108 of FIG. 1 correspond respectively to differential paths/terminals 104+/104− and 108+/108−. Signal paths in FIG. 3 are assumed to be differential. However, the techniques described below can be applied, with corresponding modifications, to circuits that are designed to have single-ended signal paths as well. Again in the interest of clarity of illustration, the remaining components/blocks of mobile phone 100 of FIG. 1 are not shown in FIG. 3.

The structure, components and operation of coupling circuit 380 are identical to those of coupling circuit 280 of FIG. 2. Antenna 320 may be implemented as a single-tap antenna (implemented for example, as a planar spiral inductor), and may have multiple turns/loops. The single tap of antenna 320 is denoted in FIG. 3 as port 350. Antenna 320 is implemented to have an inductance value designed for efficient inductive coupling of NFC signals (propagated to antenna 320 from terminals 104+/104−). ESD protection devices 360 and 370 are similar to ESD protection devices 222 and 227 of FIG. 2, and are respectively connected to paths 321 and 322. Paths 321 and 322 connect respective terminals of port 350 of antenna 320 to junctions 323 and 324 respectively of coupling circuits 380 and 390.

Unlike the circuit of FIG. 2 (which may need two pairs of ESD protection devices, one pair not shown in FIG. 2), the approach of FIG. 3 requires only a single pair of ESD protection devices (360 and 370), due to the need for only a single pair of paths, which could be PCB tracks when the circuit of FIG. 3 is implemented in mobile phone 100.

Coupling circuit 390 is shown containing switch block 233, and block 310. Block 310 is shown containing inductor 317 and capacitors 315 and 316. Capacitors 315 and 316 are provided to prevent damage to terminals 108+ and 108− from the magnetic field generated when NFC signals are being transmitted via antenna 320.

In operation, during a transmit interval of NFC signals, each of switches 251 and 252 of switch block 210 are open, and switches 254 and 255 of Switch block 233 are closed. Switches 254 and 255 being shorts inductor 317, and consequently the inductance of antenna 320 is unaltered. The inductance of antenna 320, having a value designed for coupling of NFC signals, NFC signals are efficiently transmitted by antenna 320. Coupling circuit 380 operates in a manner similar to operation of coupling circuit 280 described above with respect to FIG. 2, and the description is not repeated here in the interest of conciseness.

During a transmit interval of FM signals, each of switches 254 and 255 of switch block 233 is open. The parallel combination of inductor 317 and antenna 320 reduces the 'effective inductance' of the combination of that of antenna 320 and inductor 317. The inductance of inductor 317 is selected to have a value such that the 'effective inductance' has a value optimized for efficient radiation of FM signals. FM signals across terminals 108+ and 108− are thus transmitted by radiation from antenna 320. Isolation of the FM signals from coupling circuit 380 and other components (not shown in FIG. 3) that are connected to terminals 104+ and 104− is provided in a manner described with respect to the circuit of FIG. 2.

The operation of the circuit of FIG. 3 is similar to those provided in the corresponding descriptions above during time intervals in which NFC signals and FM signals are received by antenna 320 (in respective TDM intervals).

The shared antenna solutions described above reduce overall implementation area and reduced size (and hence cost) of mobile phone 100. In particular, only a pair of PCB traces (marked 321 and 322 in FIG. 3) are required to propagate both NFC signals as well as FM signals to (from) antenna 320.

In the illustrations of FIGS. 1, 2 and 3, though terminals/nodes are shown with direct connections to various other terminals, it should be appreciated that additional components (as suited for the specific environment) may also be present in the path, and accordingly the connections may be viewed as being electrically coupled to the same connected terminals.

In addition, the circuit topologies of FIGS. 2 and 3 are merely representative. Various modifications, as suited for the specific environment, without departing from the scope and spirit of several aspects of the present invention, will be apparent to one skilled in the relevant arts by reading the disclosure provided herein.

References throughout this specification to "one embodiment", "an embodiment", or similar language mean that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A circuit comprising:
   a first transceiver block to generate a first transmit signal to be transmitted using radiative techniques;
   a second transceiver block to generate a second transmit signal to be transmitted using inductive coupling;
   a single antenna coupled to the first transceiver block and the second transceiver block for transmitting the first transmit signal using radiative techniques and the second transmit signal using inductive coupling;
   wherein the first transceiver block operates according to frequency modulation (FM) techniques, the first transmit signal being a frequency modulated signal (FM) at radio frequency (RF), and the second transceiver block operates according to near-field communication (NFC) techniques, the second transmit signal being a NFC signal at a final frequency;
   wherein the first transceiver block is designed to process an FM signal received from the single antenna by radiative coupling, and wherein the second transceiver is designed to process a NFC signal received from the single antenna by inductive coupling;
   wherein the first transceiver block and the second transceiver block operate to transmit or receive corresponding signals in a time division multiplexed (TDM) manner, the circuit further comprising a first coupling circuit and a second coupling circuit;
   wherein the first coupling circuit operates to couple the first transceiver block to the single antenna, while isolating the single antenna from the second transceiver block during a time interval when the first transceiver block is operational; and
   wherein the second coupling circuit operates to couple the second transceiver block to the single antenna, while isolating the single antenna from the first transceiver block during a time interval when the second transceiver block is operational.

2. The circuit of claim 1, wherein the single antenna is designed to be a multi-tap antenna,
   wherein the first transceiver block is coupled to a first port of the single antenna,
   wherein the second transceiver block is coupled to a second port of the single antenna, and
   wherein the first port is not the same as the second port.

3. The circuit of claim 2, wherein the first port is selected at tap points of the single antenna such that the inductance offered at the first port by the single antenna has a value optimized for efficient radiation of FM signals, wherein the second port is selected at tap points of the single antenna such that the inductance offered at the second port by the single antenna has a value optimized for efficient inductive coupling of NFC signals.

4. The circuit of claim 1, wherein the single antenna is designed to be a single-tap antenna,
   wherein each of the first transceiver block and the second transceiver block is coupled to a same port of the single antenna.

5. The circuit of claim 4, wherein the first coupling circuit comprises a first pair of switches and a first inductor, wherein each switch in the first pair of switches is closed to connect the first inductor in parallel to the single-tap antenna in a duration of transmission or reception of the first transceiver block, each switch in the first pair of switches being closed to short the first inductor in a duration of transmission or reception of the second transceiver block.

6. The circuit of claim 5, wherein the second coupling circuit comprises:

an impedance matching network
a second inductor and a third inductor, the inductance values of each of the second inductor and the third inductor being selected to offer a high impedance to FM signals, while providing low impedance to NFC signals; and
a second pair of switches, wherein each switch in the second pair of switches is closed in a duration of transmission or reception of the first transceiver block, each switch in the second pair of switches being open in a duration of transmission or reception of the second transceiver block.

7. The circuit of claim 6, further comprising:
a first electrostatic discharge (ESD) protection circuit coupled to a path connecting a first junction of the first coupling circuit and the second coupling circuit, and
a second electrostatic discharge (ESD) protection circuit coupled to a path connecting a second junction of the first coupling circuit and the second coupling circuit.

8. A device comprising:
an application block to provide one or more user applications;
a first transceiver block to generate a first transmit signal to be transmitted using radiative techniques, the first transmit signal being associated with a first one of said one or more user applications;
a second transceiver block to generate a second transmit signal to be transmitted using inductive coupling, the second transmit signal being associated with a second one of said one or more user applications;
a single antenna coupled to the first transceiver block and the second transceiver block for transmitting the first transmit signal using radiative techniques and the second transmit signal using inductive coupling;
wherein the first transceiver block operates according to frequency modulation (FM) techniques, the first transmit signal being a frequency modulated signal (FM) at radio frequency (RF), and the second transceiver block operates according to near-field communication (NFC) techniques, the second transmit signal being a NFC signal at a final frequency;
wherein the first transceiver block is designed to process an FM signal received from the single antenna by radiative coupling, and wherein the second transceiver block is designed to process a NFC signal received from the single antenna by inductive coupling;
wherein the first transceiver block and the second transceiver block operate to transmit or receive corresponding signals in a time division multiplexed (TDM) manner, the device further comprising a first coupling circuit and a second coupling circuit:
wherein the first coupling circuit operates to couple the first transceiver block to the single antenna, while isolating the single antenna from the second transceiver block during a time interval when the first transceiver block is operational: and
wherein the second coupling circuit operates to couple the second transceiver block to the single antenna, while isolating the single antenna from the first transceiver block during a time interval when the second transceiver block is operational.

9. The device of claim 8, wherein the single antenna is designed to be a multi-tap antenna,
wherein the first transceiver block is coupled to a first port of the single antenna,
wherein the second transceiver block is coupled to a second port of the single antenna, and
wherein the first port is not the same as the second port.

10. The device of claim 9, wherein the first port is selected at tap points of the single antenna such that the inductance offered at the first port by the single antenna has a value optimized for efficient radiation of FM signals, wherein the second port is selected at tap points of the single antenna such that the inductance offered at the second port by the single antenna has a value optimized for efficient inductive coupling of NFC signals.

11. The device of claim 8, wherein the single antenna is designed to be a single-tap antenna,
wherein each of the first transceiver block and the second transceiver block is coupled to a same port of the single antenna.

12. The device of claim 11, wherein the first coupling circuit comprises a first pair of switches and a first inductor, wherein each switch in the first pair of switches is closed to connect the first inductor in parallel to the single-tap antenna in a duration of transmission or reception of the first transceiver block, each switch in the first pair of switches being closed to short the first inductor in a duration of transmission or reception of the second transceiver block.

13. The device of claim 12, wherein the second coupling circuit comprises:
an impedance matching network;
a second inductor and a third inductor, the inductance values of each of the second inductor and the third inductor being selected to offer a high impedance to FM signals, while providing low impedance to NFC signals; and
a second pair of switches, wherein each switch in the second pair of switches is closed in a duration of transmission or reception of the first transceiver block, each switch in the second pair of switches being open in a duration of transmission or reception of the second transceiver block.

14. The device of claim 13, further comprising:
a first electrostatic discharge (ESD) protection circuit coupled to a path connecting a first junction of the first coupling circuit and the second coupling circuit, and
a second electrostatic discharge (ESD) protection circuit coupled to a path connecting a second junction of the first coupling circuit and the second coupling circuit.

* * * * *